United States Patent
Yokoyama et al.

(10) Patent No.: US 11,258,923 B2
(45) Date of Patent: Feb. 22, 2022

(54) INFORMATION PROCESSING DEVICE, CONTROL METHOD, AND RECORDING MEDIUM

(71) Applicant: CANON KABUSHIKI KAISHA, Tokyo (JP)

(72) Inventors: Toshihiro Yokoyama, Kawasaki (JP); Mitsuru Konji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/128,771

(22) Filed: Dec. 21, 2020

(65) Prior Publication Data

US 2021/0112177 A1 Apr. 15, 2021

Related U.S. Application Data

(63) Continuation of application No. 16/793,879, filed on Feb. 18, 2020, now Pat. No. 10,904,406, which is a continuation of application No. 16/133,124, filed on Sep. 17, 2018, now Pat. No. 10,574,855, which is a continuation of application No. 15/472,808, filed on Mar. 29, 2017, now Pat. No. 10,116,832.

(30) Foreign Application Priority Data

Mar. 31, 2016 (JP) .................. 2016-072786

(51) Int. Cl.
*H04N 1/327* (2006.01)
*H04W 4/80* (2018.01)
*H04W 76/10* (2018.01)

(52) U.S. Cl.
CPC ..... *H04N 1/32776* (2013.01); *H04N 1/32797* (2013.01); *H04W 4/80* (2018.02); *H04W 76/10* (2018.02); *H04N 2201/0041* (2013.01); *H04N 2201/0094* (2013.01)

(58) Field of Classification Search
CPC .......... H04N 1/32776; H04N 1/32797; H04N 2201/0041; H04N 2201/0094; H04W 4/80; H04W 76/10
USPC ........................................ 358/1.15
See application file for complete search history.

(56) References Cited

U.S. PATENT DOCUMENTS

| | | | |
|---|---|---|---|
| 2014/0080550 A1* | 3/2014 | Ino ..................... | H04W 52/0254 455/574 |
| 2014/0240782 A1* | 8/2014 | Terashita .............. | G06F 3/1292 358/1.15 |
| 2015/0264650 A1* | 9/2015 | Sekine ............. | H04M 1/72412 370/311 |

* cited by examiner

*Primary Examiner* — Allen H Nguyen
(74) *Attorney, Agent, or Firm* — Canon U.S.A., Inc., IP Division

(57) ABSTRACT

A control method of an information processing device that communicates with a communication device includes accepting a connection processing instruction to connect the communication device with at least one external device, and performing processing to execute newly, in a case that the connection processing instruction is accepted and the communication device is not connected to any external device, the connection processing.

20 Claims, 7 Drawing Sheets

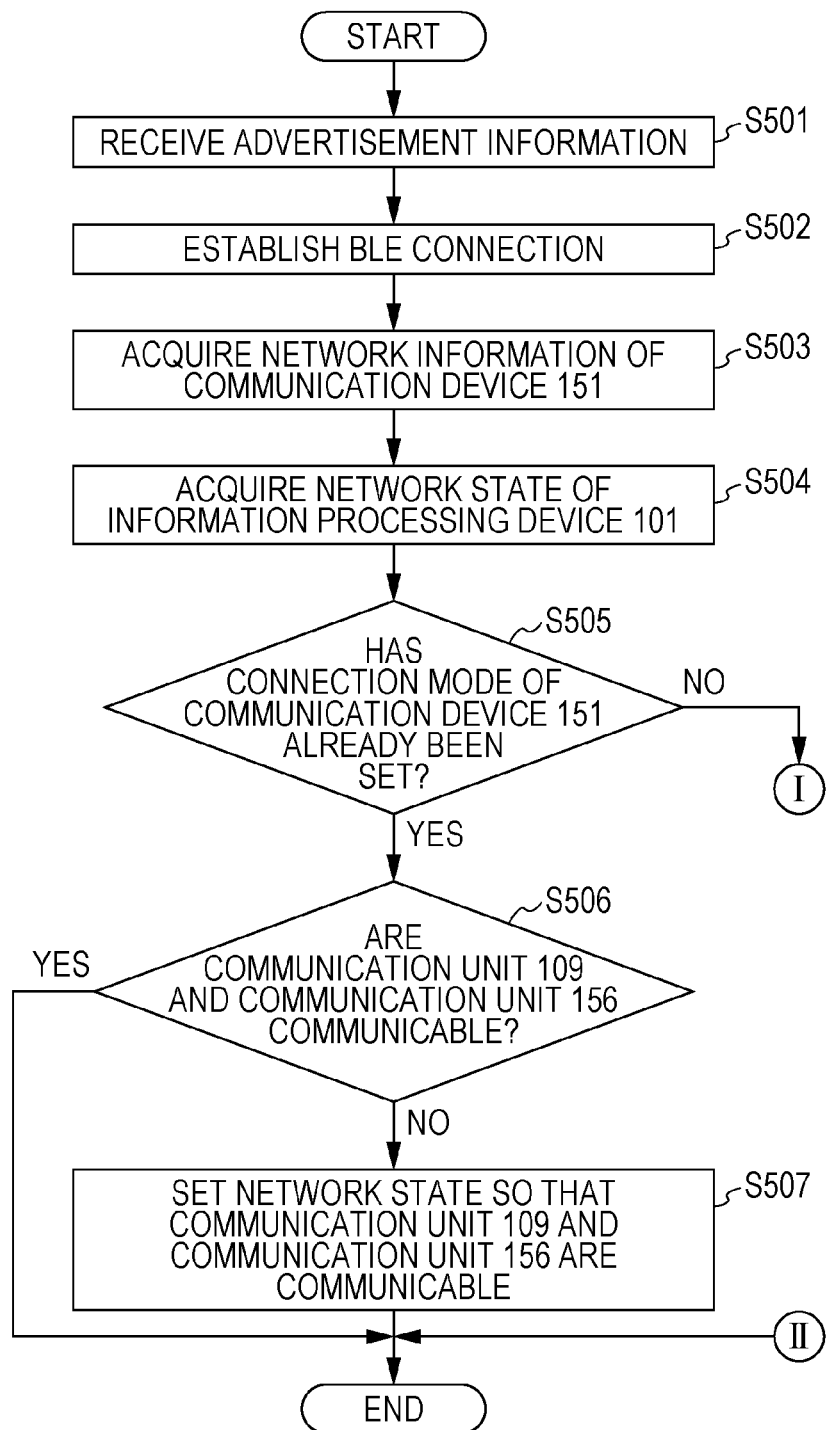

INFORMATION PROCESSING DEVICE, CONTROL METHOD, AND RECORDING MEDIUM

This application is a continuation application of U.S. patent application Ser. No. 16/793,879 filed on Feb. 18, 2020 which is a continuation application of U.S. patent application Ser. No. 16/133,124 filed on Sep. 17, 2018 which issued as U.S. Pat. No. 10,574,855 on Feb. 25, 2020 which is a continuation application of U.S. patent application Ser. No. 15/472,808 filed on Mar. 29, 2017 which issued as U.S. Pat. No. 10,116,832 on Oct. 30, 2018 which claims the benefit of Japanese Patent Application No. 2016-072786 filed Mar. 31, 2016, all of which are hereby incorporated by reference herein in its entirety.

BACKGROUND

Field

The present disclosure relates to an information processing device, a control method, and a recording medium.

Description of the Related Art

With regard to a communication system where an information processing device such as a smartphone or the like and a communication device such as a printer or the like perform communication, there is known an information processing device that performs connection processing where an external device to which the communication device is to be connected is decided, and the external device and the communication device are connected. Japanese Patent Laid-Open No. 2013-219430 describes a user device that connects an access point and a printer in accordance with the connection status of the user device and the access point.

Generally, in a case where a printer is already connected to an access point by connection processing having been performed where the printer and access point are connected, the user device does not need to perform reconnection processing. However, the device described in Japanese Patent Laid-Open No. 2013-219430 can execute connection processing to connect the printer and access point, even though the printer and access point are already connected. Accordingly, the device described in Japanese Patent Laid-Open No. 2013-219430 can unnecessarily use resources by executing connection processing.

SUMMARY

What is needed is to suppress unnecessary use of resources occurring due to executing processing to connect an external device and communication device in a case where the communication device is connected to the external device.

A control method of an information processing device that communicates with a communication device includes accepting a connection processing instruction to connect the communication device with at least one external device, and performing processing to execute newly, in a case that the connection processing instruction is accepted and the communication device is not connected to any external device, the connection processing wherein a case that the connection processing instruction is accepted and the communication device is connected to at least one external device, the connection processing is not executed newly.

Further features will become apparent from the following description of exemplary embodiments with reference to the attached drawings.

BRIEF DESCRIPTION OF THE DRAWINGS

FIGS. 5A and 5B are a flowchart illustrating processing that an information processing device according to a first embodiment executes.

DESCRIPTION OF THE EMBODIMENTS

Exemplary embodiments will be described below with reference to the drawings. It should be understood that one having ordinary skill in the art can make various modifications and improvements to the below-described embodiments without departing from the spirit and scope of the described embodiments, and that such modifications and improvements are seen to be applicable.

First Embodiment

Description will be made regarding the information processing device and communication device included in the communication system according to the present embodiment. A smartphone will be described as an example of the information processing device, while a printer will be described as an example of the communication device in the present embodiment. The information processing device in the present embodiment is not limited to being a smartphone, and various devices can be applied, such as a mobile terminal, laptop PC, tablet terminal, personal digital assistant (PDA), digital camera, and so forth. The communication device in the present embodiment is not limited to being a printer, and various devices that can wirelessly communicate with the information processing device are applicable. Examples include a photocopier, facsimile device, mobile terminal, smartphone, laptop PC, tablet terminal, PDA, digital camera, music player, television set, and so forth. Moreover, the communication device can be applied to a multifunction device that includes multiple functions, such as copying functions, facsimile functions, printing functions, and so forth.

Figure 1:
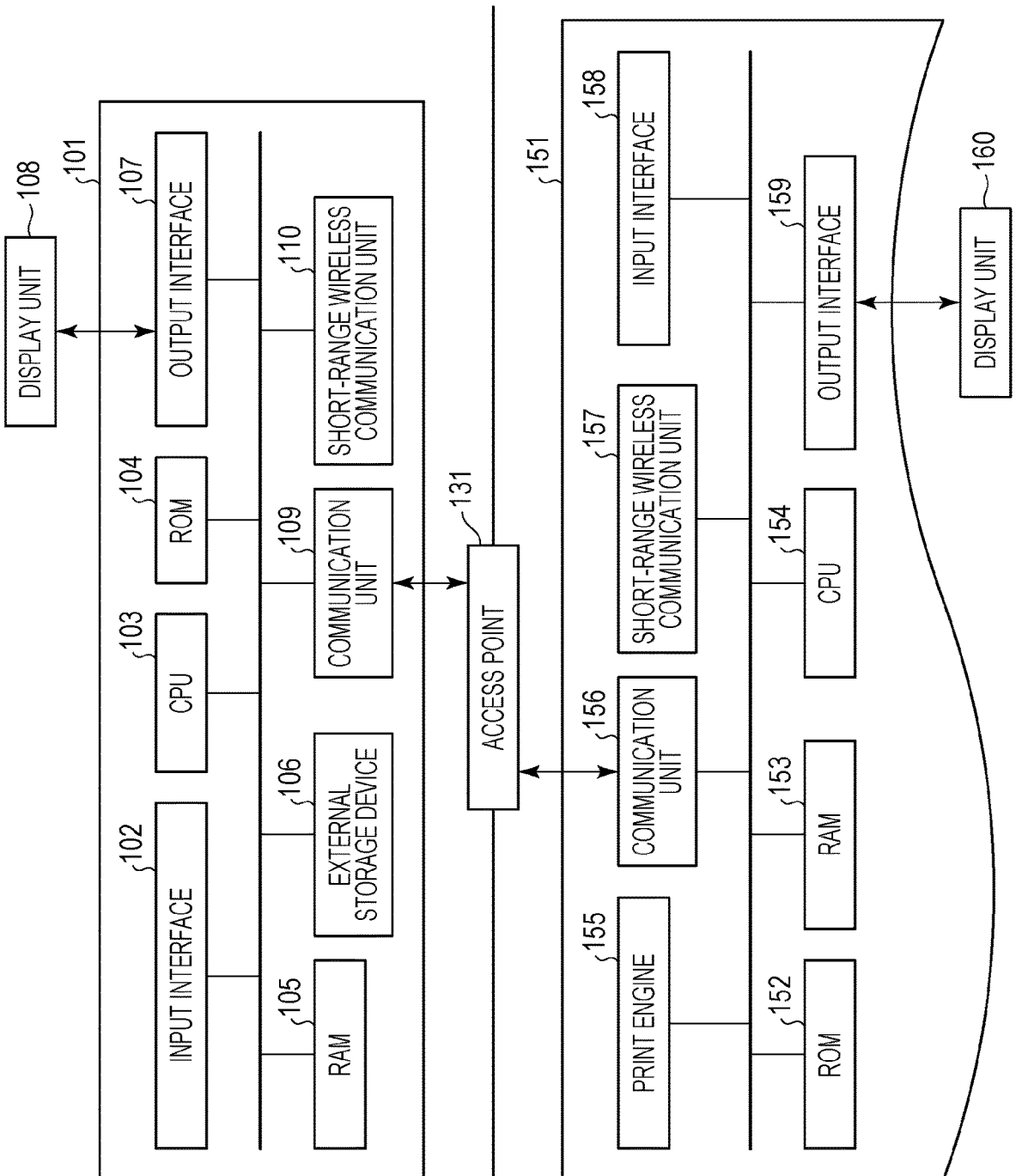
FIG. 1 is an illustrated example of the configuration of an information processing device and communication device according to an embodiment.

First, the configurations of the information processing device and communication device according to the present embodiment will be described with reference to the block diagram illustrated in FIG. 1. Although description of the present embodiment will be made by way of the configuration exemplified in FIG. 1, the devices are not restricted to the functions illustrated therein.

An information processing device 101 is the information processing device according to the present embodiment. The information processing device 101 includes an input interface 102, a central processing unit (CPU) 103, read-only memory (ROM) 104, random access memory (RAM) 105, external storage 106 an output interface 107, a display unit 108, a communication unit 109, a short-range wireless communication unit 110, and so forth. Note that these elements are connected to each other via a system bus.

The input interface 102 is an interface that accepts data input and operation instructions from a user via an operating unit (omitted from illustration) such as physical keys or buttons, a touch panel, or the like. At least part of the operating unit and the later-described display unit 108 can be integrated, so that, for example, output from a screen and accepting operations from the user are performed on the same screen.

The CPU 103 is a system control unit. The CPU 103 controls the overall information processing device 101 by executing programs, activating hardware, and so forth. The ROM 104 stores fixed data, such as control programs executed by the CPU 103, data tables, embedded operating system (OS) programs, and so forth. The control programs stored in the ROM 104 in the present embodiment perform software execution control such as, for example, scheduling, task switching, interrupt processing, and so forth, under the embedded OS stored in the ROM 104.

The RAM 105 is made up of static RAM (SRAM), dynamic RAM (DRAM), or the like. The data in the RAM 105 can be kept by a primary battery for data backup, which is omitted from illustration. In this case, the RAM 105 can store important data, such as program control variables and the like, in a non-volatile manner. A memory area for storing settings information of the information processing device 101 and management data and the like of the information processing device 101 is also provided to the RAM 105. The RAM 105 is also used as a main memory and a work memory for the CPU 103.

The external storage 106 stores applications that provide printing execution functions, print job generating programs that generate print jobs interpretable by a communication device 151, and so forth. The external storage 106 also stores various types of programs, such as information transmission/reception control programs for transmission/reception with the communication device 151 connected via the communication unit 109, and various types of information used by these programs.

The output interface 107 is an interface that performs control so that the display unit 108 can display data and provide notifications regarding the state of the information processing device 101. The display unit 108 includes light-emitting diodes (LED), a liquid crystal display (LCD), or the like, and displays data and notifications of the state of the information processing device 101. A soft keyboard including numeric input keys, mode setting keys, an OK key, a cancel key, a power key, and so forth, can be provided on the display unit 108 to enable user input to be accepted via the display unit 108.

The communication unit 109 is a component that connects to the communication device 151, an access point 131, or the like, to execute data communication. The communication unit 109 connects to an access point (omitted from illustration) within the communication device 151, for example, thereby enabling communication between the information processing device 101 and the communication device 151. The communication unit 109 can directly communicate with the communication device 151 by wireless communication, or can communicate via an external device that exists outside of the information processing device 101 and the communication device 151. The external device includes an access point that exists outside of the information processing device 101 and the communication device 151 (access point 131, etc.), and a device that is not an access point but can relay communication.

Examples of wireless communication standard (format) include, but are not limited to, Wireless Fidelity (Wi-Fi®) and Bluetooth®. Examples of the access point 131 include, but are not limited to, devices such as a wireless local area network (LAN) router.

In the present embodiment, an arrangement where the information processing device 101 and communication device 151 directly connect without going through an external access point will be referred to as "direct connection". An arrangement where the information processing device 101 and communication device 151 connect via an external access point will be referred to as "infrastructure connection". The information processing device 101 transmits print jobs for the communication device 151 to print, via the communication unit 109 in the present embodiment. Jobs that are transmitted are not restricted to print jobs, an can include scan jobs for the communication device 151 to perform scans, setting commands to change settings of the communication device 151, and so forth.

The short-range wireless communication unit 110 is a component that wirelessly connects to devices, such as the communication device 151 and so forth, at close distance to perform data communication and performs communication using a different communication standard from the communication unit 109. The short-range wireless communication unit 110 is connectable to a short-range wireless communication unit 157 within the communication device 151. Bluetooth® Low Energy is used as the communication standard (format) for the short-range wireless communication unit 110 in the present embodiment. That is, the short-range wireless communication unit 110 includes a Bluetooth® Low Energy unit.

The Bluetooth® Low Energy unit includes a microprocessor that processes wireless communication and a wireless communication circuit that transmits/receives data by wireless communication. The microprocessor includes RAM and flash memory. Accordingly, the short-range wireless communication unit 110 is used to receive later-described advertisement information, and for Generic Attribute Profile (GATT) communication by the short-range wireless communication unit 157. GATT is a profile governing reading and writing (transmission/reception) of information in the Bluetooth® Low Energy standard. The communication standard of the short-range wireless communication unit 110 is not restricted to Bluetooth® Low Energy, and, for example, near field communication (NFC) or Wi-Fi Aware™ can be used.

The communication device 151 is the communication device according to the present embodiment. The communication device 151 includes ROM 152, RAM 153, a CPU 154, a print engine 155, a communication unit 156, the short-range wireless communication unit 157, and so forth.

The communication unit 156 includes an access point to connect to devices, such as the information processing device 101 and so forth, as an access point within the communication device 151. This access point can connect to the communication unit 109 of the information processing device 101. The communication unit 156 can directly communicate with the information processing device 101 by wireless communication, or can communicate via the access point 131. As previously indicated, examples of communication standards include Wi-Fi®, Bluetooth®, and so forth. The communication unit 156 can include hardware to function as an access point, or can use software to function/operate as an access point.

The short-range wireless communication unit 157 is a configuration that wirelessly connects to devices such as the information processing device 101 and so forth at close distance. Bluetooth® Low Energy is used as the communication standard of the short-range wireless communication unit 157 in the present embodiment. Accordingly, the short-range wireless communication unit 157 is used to transmit later-described advertisement information to receive Bluetooth® Low Energy connection requests, and for GATT communication with the short-range wireless communication unit 110.

An input interface 158 is an interface that accepts data input and operation instructions from a user via an operating unit (omitted from illustration) such as a physical keyboard or buttons, a touch panel, or the like. At least part of a later-described display unit 160 and the operating unit can be integrated so that, for example, output from a screen and accepting operations from the user are performed on the same screen.

An output interface 159 is an interface that performs control so that the display unit 160 can display data and notifications regarding the state of the communication device 151. The display unit 160 includes LEDs, an LCD, or the like, and displays data and notifications of the state of the communication device 151. A soft keyboard including numeric input keys, mode setting keys, an OK key, a cancel key, a power key, and so forth, can be provided on the display unit 160 to enable user input to be accepted via the display unit 160.

The RAM 153 is made up of SRAM, DRAM, or the like, that requires a backup power source. The data in the RAM 153 can be kept by a primary battery for data backup, which is omitted from illustration. In this case, the RAM 153 can store important data, such as program control variables and the like, in a non-volatile manner. A memory area for storing settings information of the communication device 151 and management data and the like of the communication device 151 is also provided to the RAM 153. The RAM 153 also is used as a main memory and a work memory for the CPU 154, to serve as a reception buffer to temporarily save print information received from the information processing device 101 or the like, and to save various types of information.

The ROM 152 stores fixed data, such as control programs executed by the CPU 154, data tables, OS programs, and so forth. The control programs stored in the ROM 152 in the present embodiment perform software execution control such as scheduling, task switching, interrupt processing, and so forth, under the embedded OS stored in the ROM 152. The CPU 154 is a system control unit. The CPU 154 controls the overall communication device 151 by executing programs, and activating hardware, and so forth.

The print engine 155 performs image formation on a recording medium, such as paper or the like, using a recording medium such, as ink or the like, based on information saved in the RAM 153 or a print job received from the information processing device 101 or the like and outputs printing results. The print job received from the information processing device 101 or the like at this time includes a large amount of transmission data requiring high-speed communication, so reception is performed in the present embodiment using the communication unit 156 that can handle higher-speed communication than the short-range wireless communication unit 157.

Memory, such as an external hard disk drive (HDD), a secure digital (SD) card, or the like, can be mounted to the communication device 151 as an optional device. Information saved in the communication device 151 can be saved in this memory.

The connection mode of the communication device 151 according to the present embodiment is set by later-described connection setting processing, and the communication device 151 performs communication with the information processing device by a connection arrangement based on the set connection mode. In the communication device according to the present embodiment, in a case of performing connection by infrastructure communication, an infrastructure connection mode is set as the connection mode. In a case of performing connection by direct connection, a direct connection mode is set as the connection mode.

The information processing device 101 operates as a master device in the present embodiment and the communication device 151 operates as a slave device. Although an example is illustrated where the information processing device 101 and communication device 151 share processing, this sharing arrangement is not seen to be limiting, and other arrangements can be used.

Processing for transmitting advertisement information and receiving a Bluetooth® Low Energy connection request in the Bluetooth® Low Energy standard will now be described. The short-range wireless communication unit 157 operates as a slave device in the present embodiment, so the short-range wireless communication unit 157 performs the above processing for transmitting and receiving.

The short-range wireless communication unit 157 performs communication using GATT communication (Bluetooth® Low Energy communication), where a 2.4 GHz frequency band is divided into 40 channels (channel 0 through 39). Of these, the 37th through 39th channels are used for transmission of advertisement information and reception of Bluetooth® Low Energy connection requests, and the 0th through 36th channels are used for data communication following Bluetooth® Low Energy connection.

Figure 2:
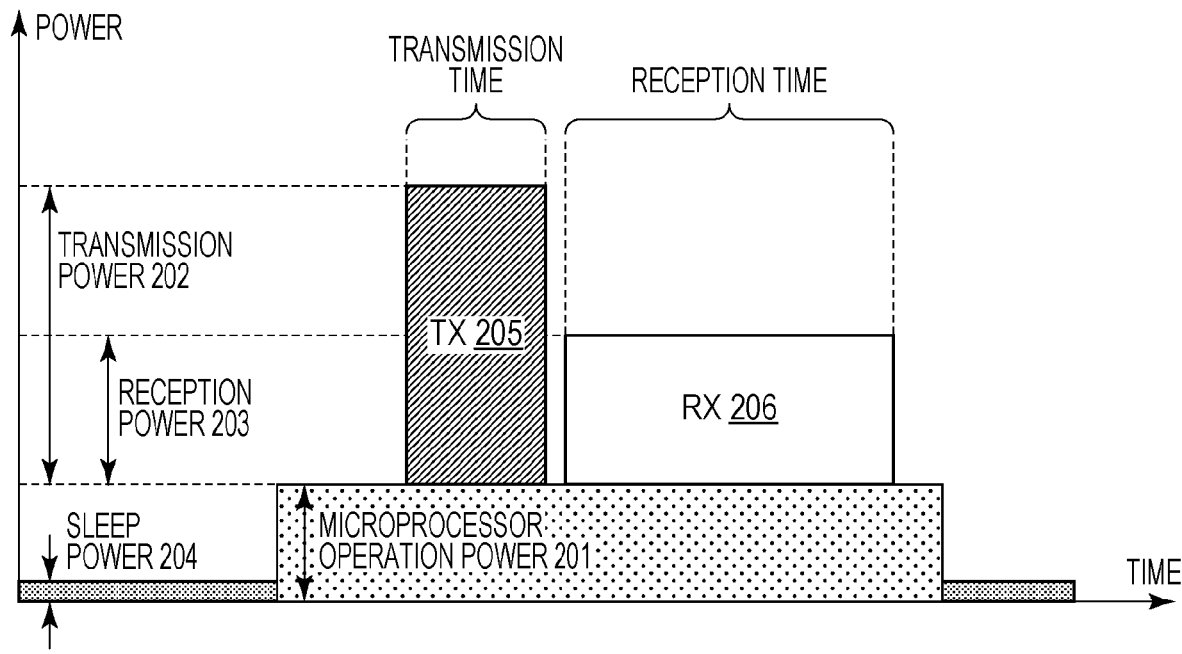
FIG. 2 is a diagram for describing processing of receiving broadcast of advertisement information and connection request information.

FIG. 2 illustrates the power consumption for transmitting advertisement information using a single channel, broken down into processes. The vertical axis represents the power consumption of the short-range wireless communication unit 157 and the horizontal axis represents time. Tx205 indicates the total amount of power consumed in processing of broadcasting advertisement information (hereinafter referred to as "transmission processing"), and Rx206 indicates the total amount of power consumed in processing of keeping the receiver enabled to receive Bluetooth® Low Energy connection requests (hereinafter referred to as "reception processing").

Transmission power 202 indicates the peak power consumption by transmission processing. Reception power 203 indicates the peak power consumption by reception processing. Microprocessor operation power 201 indicates the peak power consumption in a case where the microprocessor within the short-range wireless communication unit 157 is operating. The microprocessor operates before, during, and after Tx205 and Rx206 because the microprocessor needs to be active beforehand in order to execute or stop transmission/reception processing.

In a case where transmission of advertisement information is performed using multiple channels, the power consumption increases proportionately to the number of channels transmitting advertisement information. In a state where the short-range wireless communication unit 157 is in a power saving mode, with the microprocessor not operating, sleep power 204 is the peak power consumption of the short-range wireless communication unit 157. The short-range wireless communication unit 157 thus performs transmission processing using a predetermined channel, and thereafter performs reception processing for a predetermined amount of time using the same channel, awaiting for transmission of a Bluetooth® Low Energy connection request from the information processing device 101. In a case of having received a Bluetooth® Low Energy connection request from the information processing device 101, the short-range wireless communication unit 157 establishes a Bluetooth® Low Energy connection, and performs GATT communication with the information processing device 101.

Figure 3:
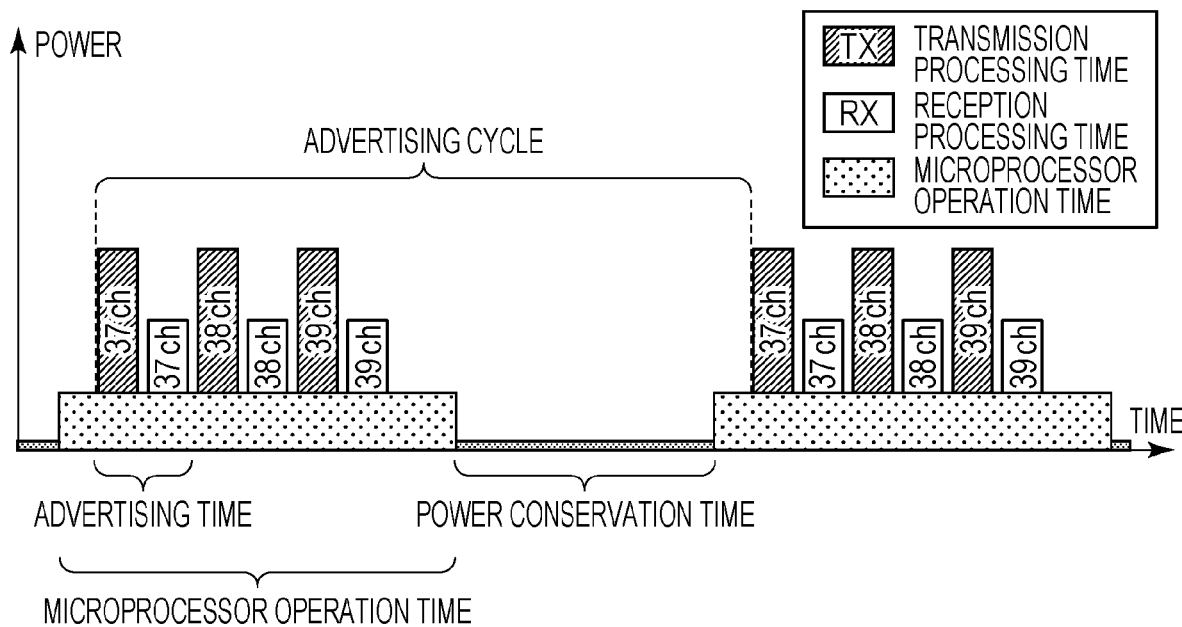
FIG. 3 is a diagram for describing advertisement in Bluetooth® Low Energy.

The short-range wireless communication unit 157 performs advertisement information transmission processing and reception processing three times for each channel, stops the microprocessor from operating, and then goes into a power saving state for a predetermined amount, as illustrated in FIG. 3. A combination of advertisement information transmission processing and reception processing at a predetermined channel will be referred to as an "advertisement", hereinafter. Also, a time cycle of transmitting advertisement information at a predetermined channel, i.e., the time cycle from transmitting advertisement information on a certain channel till transmitting the advertisement information on the same channel the next time, will be referred to as an "advertising cycle". The number of times that advertisement is repeated from the advertisement the first time until going to the power saving state can be any number that is less than or equal to three.

The information processing device 101 and the communication device 151 in the present embodiment perform mutual authentication and pairing processing to realize reading and writing of data by GATT communication. GATT communication is communication where the information processing device 101 serves as a GATT client and the communication device 151 serves as a GATT server to read and write information from the information processing device 101 to the communication device 151, using a GATT-based profile. The communication device 151 is configured such that reading and wiring of information by GATT communication is not permitted in a state where pairing has not been performed between the information processing device 101 and the communication device 151. Thus, for example, a situation can be avoided where an unpaired information processing device 101 and communication device 151 perform communication, thus preventing information stored by the communication device 151 unintentionally being acquired by the unpaired information processing device 101.

Pairing processing will now be described in detail. First, in a case where a later-described printing application is activated, and an initial screen (home screen) is displayed by the printing application on the display unit 108, the information processing device 101 begins searching for advertisement information including certain device information. Examples of the certain device information include a universally unique identifier (UUID) or media access control (MAC) address or the like of a device (a printer or the like) corresponding to the printing application.

Upon receipt of the advertisement information including the certain device information, the information processing device 101 transmits a Bluetooth® Low Energy connection request (CONNECT_REQ) to the device that transmitted the advertisement information (the communication device 151 in this case), and establishes a Bluetooth® Low Energy connection between the devices. In a case where pairing with the communication device 151 has not yet completed, the information processing device 101 displays a screen on the display unit 108 prompting the user to perform pairing.

Figure 4A:
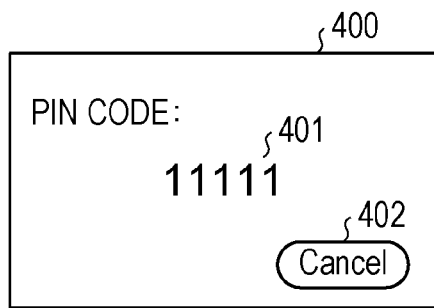
FIGS. 4A and 4B are diagrams illustrating examples of screens relating to a personal identification number (PIN).

In a case where the user has instructed execution of pairing, the information processing device 101 transmits a pairing request to the communication device 151 using the security manager protocol (SMP) in the Bluetooth® Low Energy standard. Communication between the devices is performed by SMP until pairing is complete. Upon receiving the pairing request, the communication device 151 displays a PIN code display screen 400, as illustrated in FIG. 4A, on the display unit 160. The PIN code display screen 400 displays a PIN code 401 and a cancel button 402 to cancel the pairing processing.

Figure 4B:
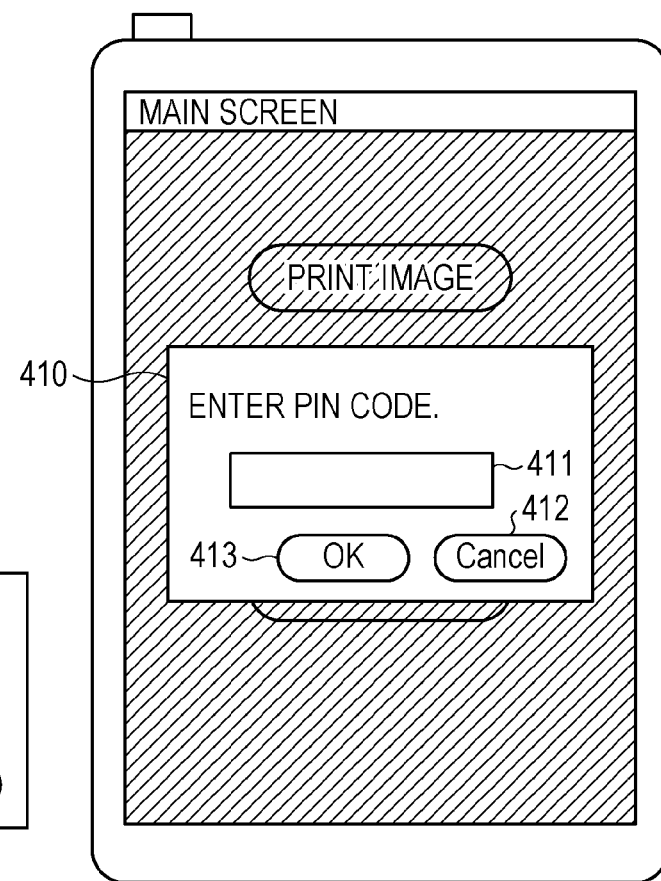

Upon transmission of the pairing request, a PIN code input screen 410, as illustrated in FIG. 4B, is displayed on the display unit 108. The PIN code input screen 410 displays a PIN code input region 411, an OK button 413, and a cancel button 412. The PIN code input region 411 is a region to accept input of the PIN code 401 by the user. The OK button 413 is a button to transmit the input PIN code 401 to the communication device 151, and the cancel button 412 is a button to cancel the pairing processing. When the OK button 413 is pressed in a state where the PIN code 401 is input to the PIN code input region 411, the information processing device 101 transmits information including the input PIN code 401 to the communication device 151. The information processing device 101 determines whether the PIN code 401 included in the received information matches the PIN code 401 displayed in the PIN code display screen 400, and if determination is made that these match, permits the information processing device 101 to pair.

More specifically, the communication device 151 transmits a link key created by a predetermined method based on the PIN code 401 to the information processing device 101 using SMP in the Bluetooth® Low Energy standard. Thus, the link key is stored in each of a storage region that the information processing device 101 has (ROM 104 or the like) and a storage region that the communication device 151 has (ROM 152 or the like). This completes pairing, and thereafter, Bluetooth® Low Energy communication is permitted among the devices. Once the pairing is completed, the information processing device 101 hides the PIN code display screen 400 from display, and returns to displaying the original screen.

After paring is complete, when the information processing device 101 transmits a GATT communication request to the communication device 151, the link key saved in the storage region at the time of pairing processing is notified to the communication device 151. Upon receipt of a GATT communication request, the communication device 151 compares the link key saved in the storage region at the time of pairing processing with the notified link key, and confirms whether the device issuing the GATT communication request is a device with which pairing has been completed.

In a case where confirmation has been made that the device has been paired with, the communication device 151 starts reading and writing of information with the information processing device 101 by GATT communication. Accordingly, once pairing processing with the communication device 151 is completed, the information processing device 101 can execute GATT communication with the communication device 151 without the user having to input the PIN code anymore.

Although an arrangement has been described above where the user inputs the PIN code 401 displayed in the PIN code input region 411 on the PIN code input screen 410, this arrangement is not restrictive. For example, the PIN code 401 can be fixed, i.e., the user cannot optionally change, information that is stored in the information processing device 101 at the time of installing the later-described printing application. Thus, the PIN code 401 is provided to the communication device 151 even without user input. The timing of starting the pairing processing is not restricted to the above arrangement either, and, for example, can be a timing at which the user instructs printing via the printing application, or a timing before Bluetooth® Low Energy connection is performed in a later-described connection setting processing, or the like.

The processing of the communication device 151 to set a network state (connection setting processing) will now be described. This connection setting processing is processing to set the order in which the communication device 151 will be connected to other devices, such as the information processing device 101 and so forth. In the present embodiment, in a case of connecting to other devices in the above-described infrastructure connection, the infrastructure connection mode is set to the communication device 151 by the connection setting processing. In a case of connecting to other devices in the above-described direct connection, the direct connection mode is set to the communication device 151 by the connection setting processing.

At least two different communication standards are used for communication in the connection setting processing according to the present embodiment. A description will be provided regarding an arrangement where the short-range wireless communication unit 110 and short-range wireless communication unit 157 perform communication by Bluetooth® Low Energy in the present embodiment. Note that in the present embodiment, the short-range wireless communication unit 157 functions as an advertiser (or slave) that broadcasts later-described advertisement information, and the short-range wireless communication unit 110 functions as a scanner (or master) that receives the advertisement information. The communication unit 109 and communication unit 156 communicate by wireless LAN (Wi-Fi®) in this description.

The information processing device 101 uses a predetermined application stored in the ROM 104 or external storage 106 or the like to perform connection setting processing. The predetermined application is an application that sets an access point for the communication device 151 to connect to, causes the communication device 151 to print image data, document data, or the like within the information processing device 101, and so forth, and hereinafter will be referred to as a "printing application". The printing application can include other functions besides the function of setting an access point for the communication device 151 to connect to and printing functions. For example, the printing application can include functions to scan a document set in the communication device 151 in a case where the communication device 151 has a scanning function, functions for performing other settings of the communication device 151, functions for confirming the state of the communication device 151, and so forth.

Figure 7:
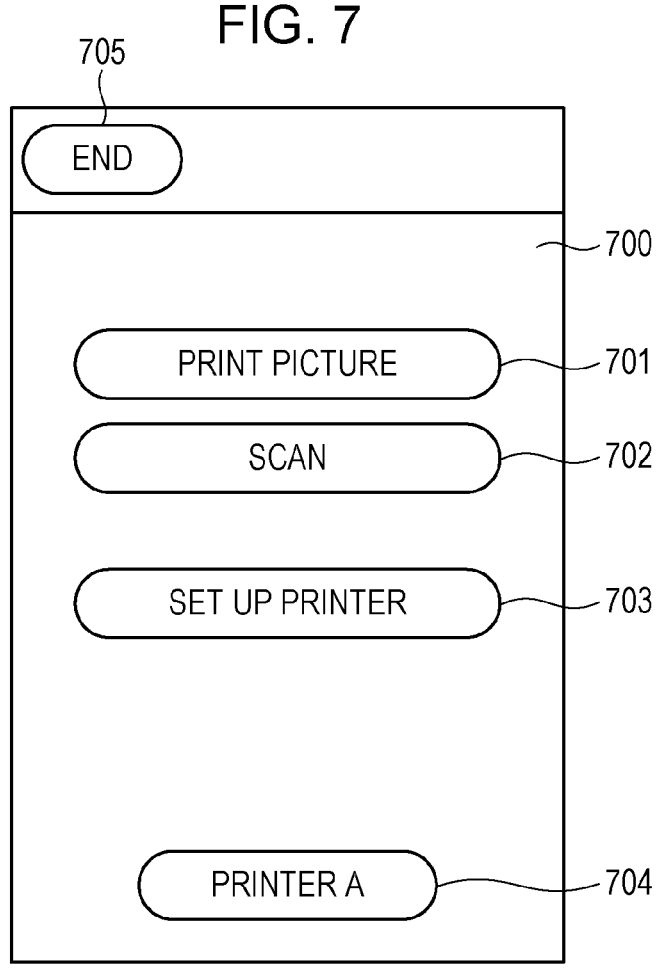
FIG. 7 is a diagram illustrating an example of a screen displayed in a case where a printing app has been activated in the information processing device according to an embodiment.

FIG. 7 is an example of a screen displayed on the display unit 108 when the printing application is started. The user can use the communication device's 151 functions, such as printing a desired image or performing settings of the communication device 151, via a startup screen 700. Upon detecting that a printer setup button 703 has been pressed, the information processing device 101 starts connection setting processing. The communication device 151 transitions to a connection setting mode to perform connection setting processing regarding the communication device 151 in the present embodiment.

The connection setting mode is a mode that the communication device 151 is set to when a connection mode is to be set to the communication device 151, and is set to the communication device 151 in a case where the user has performed a predetermined input at an operating unit that the communication device 151 has, or the like. Once in the connection setting mode, the communication device 151 starts transmission of advertisement information via the short-range wireless communication unit 157. The timing at which the communication device 151 starts transmission of advertisement information is not restricted to the above-described arrangement, and can be at a timing at which the power of the communication device 151 is turned on, the timing at which a predetermined operation is performed to enable the Bluetooth® Low Energy function, or the like, for example. In this case, the connection setting processing is performed at the communication device 151, so there the communication device 151 does not need to be set to the connection setting mode.

Figure 5B:
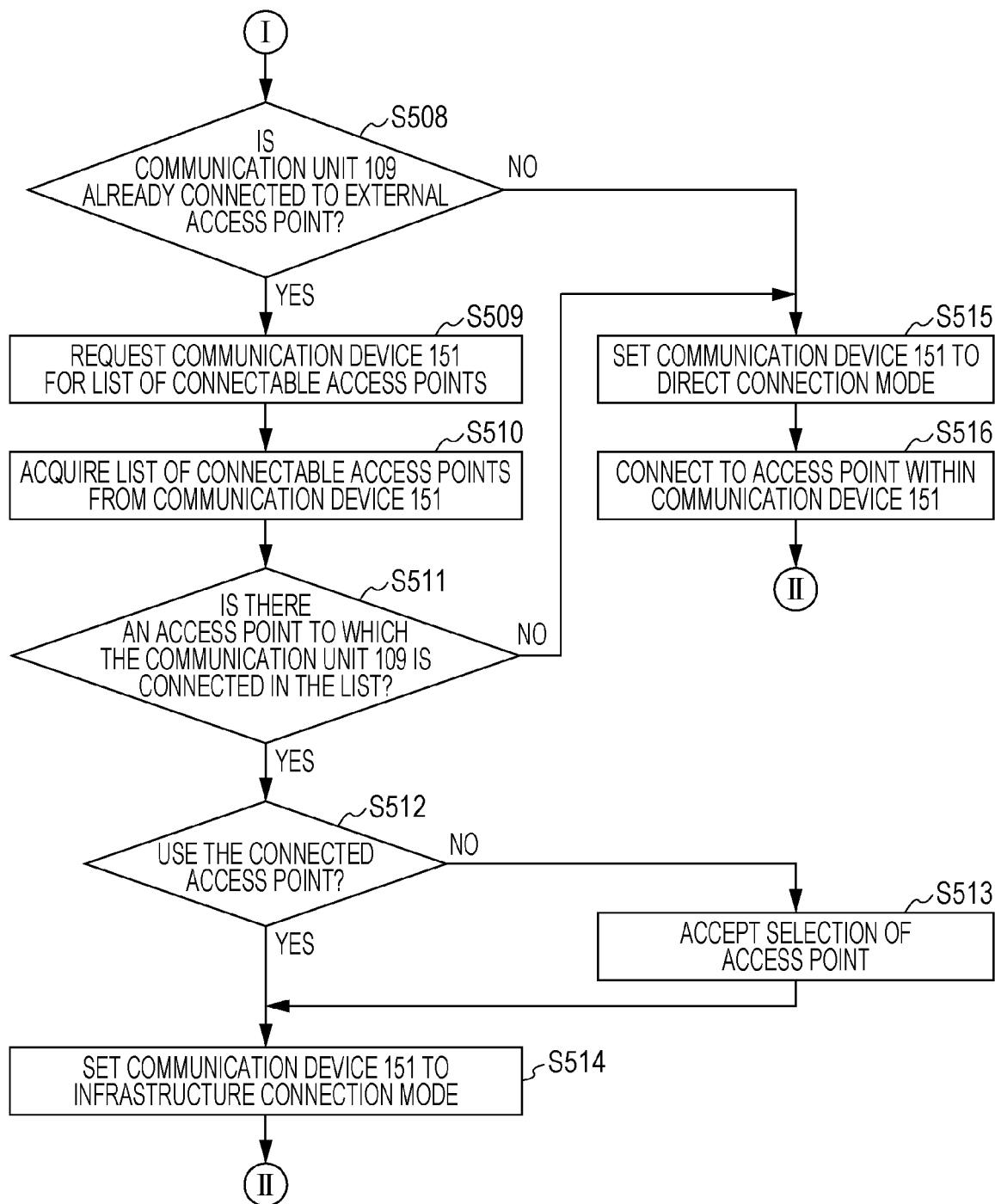

FIGS. 5A and 5B is a flowchart illustrating connection setting processing that the information processing device 101 according to the present embodiment performs. The processing in the flowchart in FIGS. 5A and 5B is realized by the CPU 103 reading out a program stored in memory, such as the ROM 104 or the like, to the RAM 105 and executing the program. Note that the processing illustrated in the flowchart in FIGS. 5A and 5B is started in a case where the printer setup button 703 is pressed in a state where pairing between the information processing device 101 and communication device 151 is completed. It is also assumed that the communication device 151 has already transitioned to the connection setting mode at this time.

In S501, the CPU 103 detects reception of advertisement information issued from the communication device 151, via the short-range wireless communication unit 110. At this time, the CPU 103 confirms whether the advertisement type included in the received advertisement information is ADV_IND or ADV_DIRECT_IND permitting a connection request to the communication device 151. In a case where this type of advertisement information has been received, the CPU 103 deems advertisement information to have been received. This advertisement information can be continuously emitted by the communication device 151, or issuing can be started in a case where the communication device 151 detects a predetermined user operation to enable Bluetooth® Low Energy communication at an operating unit that the communication device 151 has, or the like.

In S502, the CPU 103 transmits a Bluetooth® Low Energy connection request to the communication device 151 via the short-range wireless communication unit 110, establishes a Bluetooth® Low Energy connection between the short-range wireless communication unit 110 and communication device 151, and starts GATT communication. In step S503, the CPU 103 acquires network information of the communication device 151 by GATT communication via the short-range wireless communication unit 110. The network information of the communication device 151 is information indicating whether the communication unit 156 of the communication device 151 is connected to an external access point and whether the access point function within the communication device 151 is enabled (connection status information).

If the access point function within the communication device 151 is enabled, connection can be made between the access point function within the communication device 151 and other devices, such as the information processing device 101 (connection enabled state). The network information of the communication device 151 also, for example, includes information of the access point to which it is connected (service set identifier (SSID), MAC address, Internet Protocol (IP) address, passwords necessary for connection, and so forth). The network information of the communication device 151 can be, for example, flags indicating whether the communication unit 156 of the communication device 151 is connected to an external access point and whether the access point function within the communication device 151 is enabled.

In S504, the CPU 103 acquires the network information of the information processing device 101. The network information of the information processing device 101 includes information of the connection status between the communication unit 109 that the information processing device 101 has and the external access point of the information processing device 101. Specifically, the network information of the information processing device 101 includes whether the communication unit 109 is connected to an external access point, whether the communication unit 109 is connected to an internal access point in the communication device 151, whether the communication unit 109 is not connected to an access point, and so forth. In a case where the communication unit 109 is connected to any of the access points, the network information of the information processing device 101 also includes information of the access point to which the communication unit 109 is connected (SSID, MAC address, IP address, passwords necessary for connection, and so forth).

In S505, the CPU 103 references the network information of the communication device 151 acquired in S503, and determines whether the connection mode of the communication device 151 has been set. Specifically, in a case where the communication unit 156 is connected to an external access point or other external devices, or the internal access point function within the communication device 151 is enabled, the CPU 103 determines that the connection mode of the communication device 151 has been set.

In a case where the communication unit 156 is not connected to an external access point, and the internal access point function within the communication device 151 is not enabled, the CPU 103 determines that the connection mode of the communication device 151 has not been set. The reason is that if the infrastructure connection mode is set to the communication device 151, the communication unit 156 is connected to an external access point, and if the direct connection mode is set to the communication device 151, the internal access point function within the communication device 151 is enabled.

The CPU 103 can determine whether the connection mode of the communication device 151 is set by a different method at this time. For example, in a case where the communication unit 156 is connected to an external access point, an external device other than the information processing device 101 or the communication unit 109, the CPU 103 may determine that the connection mode of the communication device 151 is set. In a case where the communication unit 156 is not connected to any of these, the CPU 103 can determine that the connection mode of the communication device 151 is not set. The reason is that if the infrastructure connection mode is set to the communication device 151, the communication unit 156 is connected to an external access point, and if the direct connection mode is set to the communication device 151, the communication unit 156 is connected to an external device other than the information processing device 101 or the communication unit 109.

In a case of the CPU 103 determining that the connection mode of the communication device 151 is set, the flow advances to S506. In a case of determining that the connection mode of the communication device 151 is not set, the flow advances to S508.

In S506, the CPU 103 references the network information acquired in S503 and S504, and determines whether the communication unit 109 and the communication unit 156 can communicate. In a case where the communication unit 109 and the communication unit 156 are connected to the same external access point or the communication unit 109 is connected to the internal access point within the communication device 151, the CPU 103 determines that the communication unit 109 and the communication unit 156 can communicate. In a case where the communication unit 109 and the communication unit 156 are connected to different external access points, the CPU 103 determines that the communication unit 109 and communication unit 156 cannot communicate.

In a case where the internal access point within the communication device 151 is enabled, but the communication unit 109 is not connected to this access point, the CPU 103 determines that the communication unit 109 and communication unit 156 cannot communicate. In a case where the CPU 103 determines that the communication unit 109 and communication unit 156 can communicate, the connection setting processing ends. In a case where "cannot communicate" is determined, the flow advances to S507.

In S507, the CPU 103 sets the network state so that the communication unit 109 and communication unit 156 can communicate. In a case where the communication unit 156 is connected to an external access point, the CPU 103 connects the communication unit 109 to the access point to which the communication unit 156 is connected. In a case where the internal access point within the communication device 151 is enabled, the CPU 103 connects the communication unit 109 to the internal access point within the communication device 151. In a case where connection information necessary for connection to the access point to which connection is to be made is already stored in the storage region of the information processing device 101, the CPU 103 uses this connection information to connect the communication unit 109 to the access point without user operations at this time. A case where connection information is already stored in the storage region of the information processing device 101 is, for example, a case where the information processing device 101 previously connected to this access point or a case where connection information is stored in the network information received in S503.

In a case where connection information necessary for connection to the access point to which connection is to be made is not stored in the storage region of the information processing device 101, the CPU 103 displays a screen for accepting input of connection information on the display unit 108, and accepts input of connection information from the user. A case where connection information is not already stored in the storage region of the information processing device 101 is, for example, a case where the information processing device 101 has never connected to this access point before or a case where connection information is not stored in the network information received in S503.

In a case of accepting connection information from the user, the CPU 103 connects the communication unit 109 to the access point using the input connection information. The CPU 103 can receive connection information of an access point to which the communication unit 156 is connected or connection information to connect to the internal access point within the communication device 151 from the communication device 151 by GATT communication via the short-range wireless communication unit 110. This arrangement enables the communication unit 109 to be connected to the access point without accepting input from the user in a case where connection information necessary for connection to an access point to be connected to is not stored in the storage region of the information processing device 101 beforehand. In a case where input of connection information is necessary due to OS restrictions for example, even though where connection information necessary for connection to the access point to which connection is to be made is already stored in the storage region of the information processing device 101, input of connection information can be accepted from the user.

In S508, the CPU 103 references the network information acquired in S503, and determines whether the communication unit 109 is connected to an external access point. In a case where the communication unit 109 is connected to the network via an access point, the communication unit 156 connects to the same to establish an infrastructure connection between the devices. The reason is that generally, while Internet communication over wireless LAN cannot be performed with a direction connection, Internet communication over wireless LAN can be performed if the access point relaying the communication is connected to the Internet by infrastructure connection. Another reason is that the information processing device 101 and communication device 151 can communicate with other devices connected to the access point used for relaying communication in an infrastructure connection.

In a case where the communication unit 109 is not connected to an access point, there is a high possibility that there is no external access point near the devices, so establishing a direct connection between the devices is desirable. Accordingly, in a case where the CPU 103 determines that the communication unit 109 is connected to an external access point, the flow advances to S509 to confirm whether infrastructure connection can be executed between the information processing device 101 and communication device 151. In a case where determination is made that the communication unit 109 is not connected to an external access point, the CPU 103 determines that a direct connection is appropriate for connection between the information processing device 101 and the communication device 151, and the flow advances to S515.

In S509, the CPU 103 requests, by GATT communication via the short-range wireless communication unit 110, the communication device 151 for a list of external access points that the communication unit 156 can connect to. The requested list is a list of information for identifying external access points that the communication unit 156 can connect to like, for example, the information for identifying external access points being SSIDs or the like. In S510, the CPU 103 acquires, from the communication device 151 by GATT communication via the short-range wireless communication unit 110, the list of external access points that the communication unit 156 can connect to.

In S511, the CPU 103 determines whether an external access point to which the communication unit 109 is currently connected is included in the list acquired from the communication device 151 in S510. That is, the CPU 103 determines whether the external access point to which the communication unit 109 is currently connected is an external access point to which the communication unit 156 can connect. In a case of determining that the external access point to which the communication unit 109 is currently connected is included in the list, the CPU 103 judges that infrastructure connection is appropriate for connection of the information processing device 101 and communication device 151, and the flow advances to S512. In a case of determining that the external access point to which the communication unit 109 is currently connected is not included in the list, the CPU 103 determines that direct connection is appropriate for connection of the information processing device 101 and communication device 151, and the flow advances to S515.

In S512, the CPU 103 displays a screen on the display unit 108 to accept selection of whether to use the external access point that the communication unit 109 currently is connected to for the infrastructure connection between the information processing device 101 and communication device 151, and accepts selection from the user. The CPU 103 then determines whether to use the external access point that the communication unit 109 is currently connected to for the infrastructure connection between the information processing device 101 and communication device 151, based on the results of the accepted selection.

In a case of the CPU 103 determining to use the external access point that the communication unit 109 is currently connected to for the infrastructure connection between the information processing device 101 and communication device 151, the flow advances to S514. In a case of the CPU 103 determining not to use the external access point that the communication unit 109 is currently connected to for the infrastructure connection between the information processing device 101 and communication device 151, the flow advances to S513.

In S513, the CPU 103 prompts the user to select, from external access points to which the communication unit 156 can connect, an access point for the infrastructure connection between the information processing device 101 and communication device 151. The CPU 103 displays a screen for the selection based on the list acquired in S510, and accepts selection of an access point from the user. If authentication processing such as inputting a password or the like is necessary for connection to the selected access point, the CPU 103 also accepts input of the password from the user.

In S514, the CPU 103 transmits a command for setting the communication device 151 to the infrastructure connection mode to the communication device 151 by GATT communication via the short-range wireless communication unit 110. In a case where the processing is performed after the "Yes" determination in S512, the CPU 103 transmits information of the external access point to which the communication unit 109 is currently connected to the communication device 151 by GATT communication via the short-range wireless communication unit 110. The information of the external access point to which the communication unit 109 is currently connected includes, for example, SSID information of the access point, password necessary to connect to this access point, and so forth. Connection information to connect to the external access point to which the communication unit 109 is currently connected is also stored in the storage region of the information processing device 101 at the time of connection of the communication unit 109 to this access point.

In a case where connection information to connect to the external access point to which the communication unit 109 is currently connected is not stored in the storage region of the information processing device 101, the CPU 103 displays a screen on the display unit 108 for accepting input of the connection information. Input of the connection information to connect to the external access point to which the communication unit 109 is currently connected is accepted from the user, and the input information is transmitted to the communication device 151. The CPU 103 does not have to accept input of connection information even if the connection information is not stored in the storage region of the information processing device 101 if the external access point to which the communication unit 109 currently is connected does not require password authentication.

In a case where the processing is performed after S513, the CPU 103 transmits information of the access point selected by the user in S513 the communication device 151 by GATT communication via the short-range wireless communication unit 110. Information of the access point selected by the user in S513 includes, for example, the SSID of the access point, the password input in S513, and so forth. The processing of S514 transitions the communication device 151 to the infrastructure connection mode.

In S515, the CPU 103 transmits a command for setting the communication device 151 to the direct connection mode to the communication device 151 by GATT communication via the short-range wireless communication unit 110. Specifically, the CPU 103 requests the communication device 151 by GATT communication via the short-range wireless communication unit 110 to enable the access point within the communication device 151. The processing of S515 transitions the communication device 151 to the direct connection mode.

In S516, the CPU 103 uses the connection information to connect to the internal access point within the communication device 151 to connect the communication unit 109 to the internal access point within the communication device 151. In a case where the CPU 103 does not have the connection information to connect to the internal access point within the communication device 151, the CPU 103 receives it from the communication device 151 by GATT communication via the short-range wireless communication unit 110. In a case where the connection information to connect to the internal access point within the communication device 151 is previously stored in the storage region of the information processing device 101, the CPU 103 uses it to perform connection.

An arrangement can also be made where the CPU 103 displays a screen on the display unit 108 to accept user input of the connection information to connect to the internal access point within the communication device 151, and accept input of the connection information. A configuration can also be made where the connection information to connect to the internal access point within the communication device 151 is included in the network information of the communication device 151, and the CPU 103 references the network information acquired in S503 to perform connection. After executing the processing in S514, the CPU 103 ends the connection setting processing. In a case where the connection setting processing ends, the CPU 103 disconnects the Bluetooth® Lowe Energy connection between the short-range wireless communication unit 110 and the communication device 151.

After the processing in FIGS. 5A and 5B ends, and connection with the communication device 151 has been established by the connection form in accordance with the connection mode that the communication device 151 has been set to, the information processing device 101 can transmit jobs to the communication device 151 via the established connection. For example, the information processing device 101 can display a screen to select an image to be printed on the display unit 108, and in a case where selection of an image and an instruction to execute printing have been accepted from the user, a print job is generated and transmitted to the communication device 151 via the established connection. Accordingly, the information processing device 101 can cause the communication device 151 to execute printing.

Figure 8:
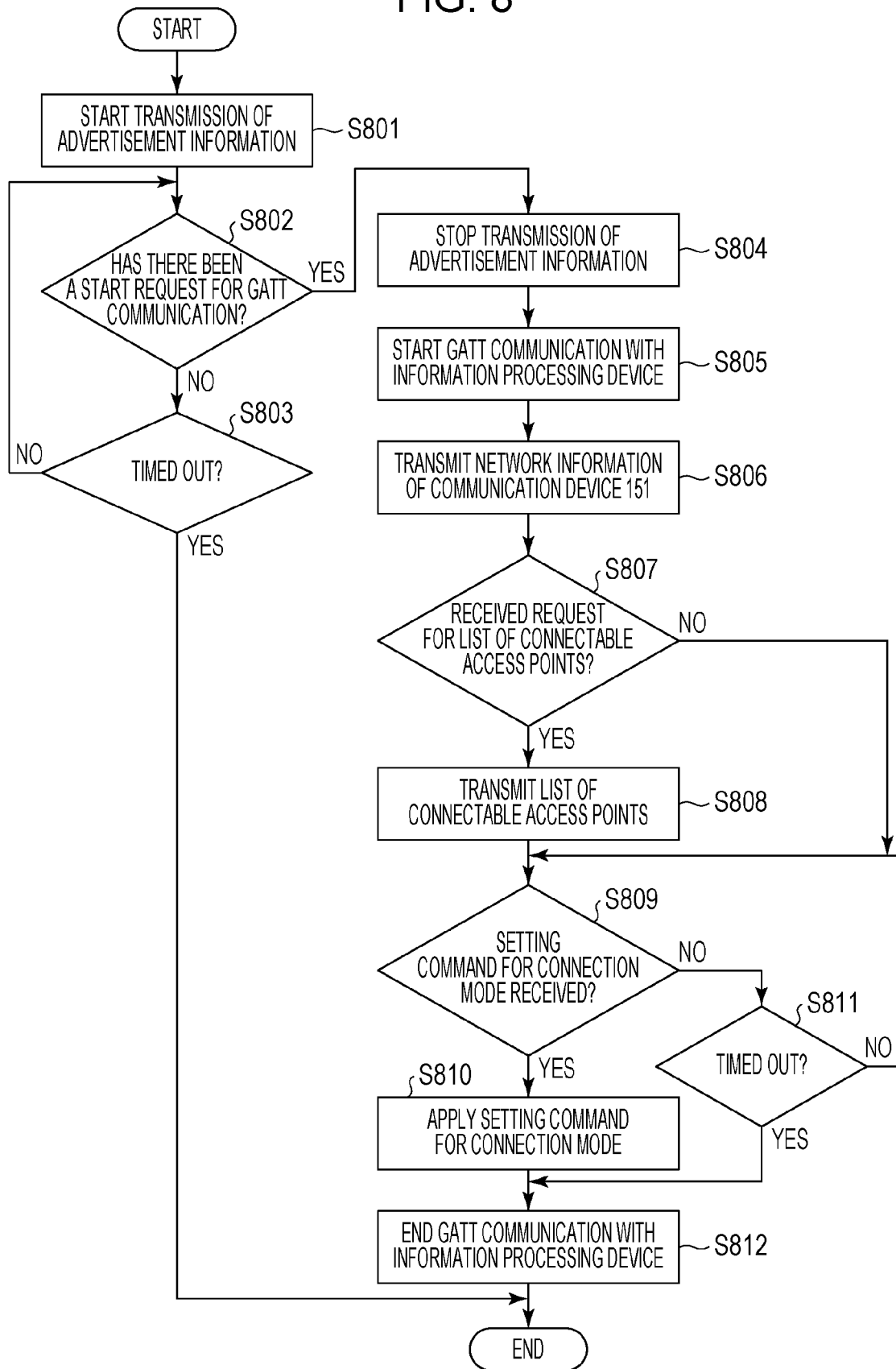
FIG. 8 is a flowchart illustrating processing that the communication device according to the first embodiment executes.

FIG. 8 is a flowchart illustrating connection setting processing executed by the communication device 151 according to the present embodiment. The processing illustrated in the flowchart in FIG. 8 is realized by the CPU 154 reading out a program stored in memory, such as the ROM 152 or the like, to the RAM 153 and executing the program. Processing illustrated in the flowchart in FIG. 8 is started upon transition to the connection setting mode in a state where pairing between the information processing device 101 and the communication device 151 has completed.

In S801, the CPU 154 enters an advertising state, which is a state where advertisement information is broadcast by the short-range wireless communication unit 157 every predetermined time period. The term "broadcast" refers to transmitting information over a certain range, without specifying a target of the transmission of information.

Next, in S802, the CPU 154 determines whether a Bluetooth® Low Energy connection request has been received from the information processing device 101 via the short-range wireless communication unit 157. In a case where the short-range wireless communication unit 157 has received a Bluetooth® Low Energy connection request, the CPU 154 performs the processing in S804. In a case where the short-range wireless communication unit 157 has not received a Bluetooth® Low Energy connection request, the CPU 154 performs the processing in S803 to determine whether a predetermined amount of time has elapsed after having transitioned to the connection setting mode (whether timed out). In a case where the process has not timed out, the CPU 154 repeats the processing of S802. In a case that the process has timed out, the CPU 154 ends the connection setting processing.

In S804, the CPU 154 temporarily stops transmission of advertisement information via the short-range wireless communication unit 157 to establish a Bluetooth® Low Energy connection and perform GATT communication. The reason is that the short-range wireless communication unit 157 cannot establish a Bluetooth® Lowe Energy connection and transmit advertisement information at the same time. In a case where the short-range wireless communication unit 157 can establish a Bluetooth® Low Energy connection and transmission of advertisement information at the same time, this processing does not have to be executed. That is, the CPU 154 can continue transmission of advertisement information via the short-range wireless communication unit 157.

In S805, the CPU 154 then establishes the Bluetooth® Low Energy connection between the short-range wireless communication unit 157 and the information processing device 101, and starts GATT communication via the short-range wireless communication unit 157. In S806, the CPU 154 transmits the network information of the communication device 151 to the information processing device 101 by GATT communication via the short-range wireless communication unit 157. As previously described, if an arrangement has been made where the network information of the communication device 151 is included in the advertisement information emitted from the short-range wireless communication unit 157, this processing is not necessary.

Next, in S807, the CPU 154 determines whether a request for a list of external access points to which the communication unit 156 can connect has been received from the information processing device 101 by GATT communication via the short-range wireless communication unit 157. In a case of the CPU 154 determining that a request for the list has been received, the flow advances to S808. In a case it is determined that a request for the list has not been received, the flow advances to S809. The CPU 154 can wait a predetermined amount of time between S806 and S807, taking into consideration the amount of time required for the processing performed by the information processing device 101.

In S808, the CPU 154 searches for external access points that the communication unit 156 can connect to, and generates a list of external access points that the communication unit 156 can connect to. The CPU 154 executes the search for external access points that the communication unit 156 can connect to by detecting beacons based on Wi-Fi® communication using the communication unit 156. After generating the list, the CPU 154 transmits the generated list to the information processing device 101 by GATT communication via the short-range wireless communication unit 157. If a list of external access points that the communication unit 156 can connect to has previously been generated, the CPU 154 can transmit the already-generated list to the information processing device 101 without searching for the external access points that the communication unit 156 can connect to.

In S809, the CPU 154 determines whether a command for setting the communication device 151 to the communication mode has been received from the information processing device 101 by GATT communication via the short-range wireless communication unit 157. In a case where it is determined that the command has been received, the CPU 154 performs the processing in S810. In a case where it is determined that the command has not been received, the CPU 154 performs the processing of S811 to determine whether a predetermined amount of time has elapsed after having started GATT communication (whether timed out). In a case where it is determined that the process has not timed out, the CPU 154 repeats the processing in S809. In a case where it is determined that the process has timed out, the CPU 154 performs the processing in S812.

In S810, the CPU 154 sets the connection mode of the communication device 151 based on the command that has been received. In a case where the received command is a command to set the communication device 151 to the infrastructure connection mode, the CPU 154 transitions the communication device 151 to the infrastructure connection mode. Specifically, the CPU 154 registers the access point (access point 131 in this case), indicated by the SSID stored in the received command, as the connection target of the communication device 151. After registration of the access point, the CPU 154 uses the connection information stored in the command to connect the communication unit 156 to the access point 131.

In a case where connection is successful, the infrastructure connection between the information processing device 101 and the communication device 151 via the access point 131 is established. Setting the communication device 151 to the infrastructure connection mode means that communication can also be performed with other information processing devices subsequently connected to the access point 131. The CPU 154 can notify the information processing device 101 by GATT communication whether connection to the access point 131 has been successful. A configuration can be made where, in a case of receiving a notification from the communication device 151 that connection to the access point has failed, the information processing device 101 re-executes the connection setting processing.

In a case where the received command is a command to set the communication device 151 to the direct connection mode, the CPU 154 transitions the communication device 151 to the direct connection mode. Specifically, the CPU 154 sets the internal access point function within the communication device 151 to be enabled, so as to be in a state where the information processing device 101 can connect to the internal access point within the communication device 151. In a case where a connection request to the internal access point within the communication device 151 is accepted from the information processing device 101, the CPU 154 permits this, and the information processing device 101 is thus in a communicable state via the communication unit 156. Setting the communication device 151 to the direct connection mode enables the internal access point within the communication device 151, so even after the connection with the information processing device 101 is disengaged, communication can be performed with other devices by performing a direct connection with those devices.

While an arrangement has been described where the internal access point within the communication device 151 is enabled in a case where the direct connection mode is set, this is not restrictive. For example, in a case of transmitting the communication device 151 to the direct connection mode, the CPU 154 can execute sequence control to perform connection by Wi-Fi Direct®. In this case, the CPU 154 performs negotiation with the information processing device 101, and determines to enable the internal access point within the communication device 151 or to connect the communication unit 156 to the internal access point within the information processing device 101, based on the results of the negotiation. In a case of deciding to enable the internal access point within the communication device 151, this access point is enabled, and connection between this access point and the communication unit 109 is established. In a case of deciding to connect the communication unit 156 to the internal access point within the information processing device 101, connection between this access point and the communication unit 156 is established.

In S812, the CPU 154 disengages the Bluetooth® Low Energy connection between the short-range wireless communication unit 157 and the information processing device 101, and ends GATT communication. The short-range wireless communication unit 157 resumes transmission of advertisement information in a case where the Bluetooth® Low Energy connection is disengaged.

According to this arrangement, the information processing device 101 can set the connection mode of the communication device 151, and can connect to the communication device 151 by the connection form in accordance with the connection mode that has been set.

Also, in the present embodiment, in a case where the connection mode of the communication device 151 has been set, the information processing device 101 connects with the communication device 151 by a connection form in accordance with the already-set connection mode, rather than setting the connection mode of the communication device 151. The information processing device 101 automatically decides whether to perform settings of the connection mode of the communication device 151 based on network information acquired from the communication device 151. Accordingly, in a case where the connection mode of the communication device 151 has been set, the information processing device 101 can omit the setting processing of the connection mode of the communication device 151, thereby reducing the load on the information processing device 101. This can also suppress a situation where another information processing device, which previously set the connection mode, cannot communicate with the communication device 151 due to the connection mode of the communication device 151 being changed.

There can also be usage cases where the user wants to change the connection mode of the communication device 151 due to, for example, a new external access point having been installed in the network environment of the communication device 151, or the like. Accordingly, the communication device 151 can have an initialization function for resetting the connection mode that is set to return to the state where no connection mode is set. The user can change the connection mode of the communication device 151 to that corresponding to a new network environment after executing the initialization function, and then the above-described connection mode setting processing.

The details of connection setting processing are not restricted to the forms described above. For example, in S501, the CPU 103 is described as receiving advertisement information in a case of receiving an advertisement of a type where a connection request to the communication device 151 is permitted, but this is not restrictive. For example, in S501 the CPU 103 can confirm detailed data contained in advertisement information other than the advertisement type. Specifically, in a case where information is included in the received advertisement information that the network status of the communication device 151 is not set, the CPU 103 can advance to S502. In this case, the CPU 103 does not have to deem the advertisement information as having been received in a case where the received advertisement information does not include information that the network status of the communication device 151 is not set.

There are also cases where the information processing device 101 receives advertisement information from multiple communication devices. In these cases, the CPU 103 detects reception of multiple sets of advertisement information that match the above conditions in S501. The CPU 103 can then display a screen illustrating a list of multiple communication devices corresponding to the multiple sets of advertisement information that have been received, such as illustrated in FIG. 6, after S501, and have the user select the communication device that the communication setting processing is to be performed on.

Figure 6:
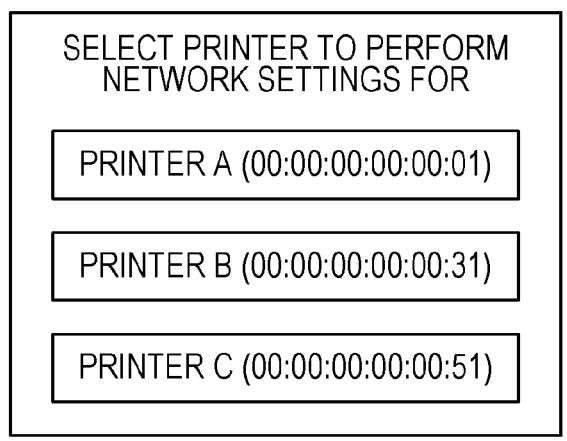
FIG. 6 is a diagram illustrating an example of a screen showing a list of multiple communication devices corresponding to multiple sets of advertisement information received by the information processing device according to the present embodiment.

FIG. 6 illustrates an example of a screen displayed in a case where advertisement information has been received from three communication devices. In the screen illustrated in FIG. 6, the device names of each of the communication devices, and the device addresses (BD_ADDR) of the short-range wireless communication units that the communication devices each have, are shown so that the user can identify the communication devices. This information is included in the advertisement information transmitted from the respective communication devices.

The CPU 103 has been described as acquiring network information of the communication device 151 in S503 by GATT communication with the communication device 151, but this is not restrictive. For example, an arrangement can be made where the network information of the communication device 151 is included in the advertisement information transmitted by the communication device 151, with the received advertisement information being referenced in the processing of referencing the network information of the communication device 151. In this case, the processing of S503 becomes unnecessary.

The CPU 103 has also been described in S509 and S510 as acquiring a list of external access points which the communication device 151 can connect to from the communication device 151, while GATT communication between the information processing device 101 and the communication device 151 remains established, but this is not restrictive. For example, in S509 the CPU 103 can temporarily release the Bluetooth® Low Energy connection after having requested the communication device 151 for a list of external access points that the communication unit 156 can connect to. In this case, after releasing the Bluetooth® Low Energy connection, the CPU 103 waits to receive advertisement information via the short-range wireless communication unit 110, including information indicating that generating of the list of external access points that the communication unit 156 can connect to, has been completed.

In a case where the advertisement information is received via the short-range wireless communication unit 110, the CPU 103 re-establishes the Bluetooth® Low Energy connection, and acquires the list of external access points that the communication unit 156 can connect to by GATT communication via the short-range wireless communication unit 110. This is to secure as much time as possible for devices other than the information processing device 101 to be able to receive the advertisement information transmitted from the short-range wireless communication unit 157.

In a case of having received a request for the list of external access points that the communication unit 156 can connect to, the communication device 151 starts to generate the list, but there are cases where generating this list takes time to complete. The short-range wireless communication unit 157 cannot transmit advertisement information while the Bluetooth® Low Energy connection is established. So, in the state where the Bluetooth® Low Energy connection is established, devices other than the information processing device 101 cannot receive advertisement information transmitted by the short-range wireless communication unit 157 as long as the communication device 151 is generating the list of external access points the communication unit 156 can connect to. Accordingly, temporarily releasing the Bluetooth® Low Energy connection, as described above, enables devices other than the information processing device 101 to receive the advertisement information being transmitted by the short-range wireless communication unit 157 while the communication device 151 is generating the list of external access points.

An arrangement can also be made where the short-range wireless communication unit 157 stops advertising while the communication device 151 is generating the list of external access points, even though the Bluetooth® Low Energy connection is released. According to this arrangement, devices other than the information processing device 101 cannot receive the advertisement information transmitted from the short-range wireless communication unit 157, but electric power consumed by the short-range wireless communication unit 157 can be reduced.

In a case where determination is made in the determination in S511 that the external access point to which the communication unit 109 is currently connected is not included in the list, the CPU 103 sets the communication device 151 to the direct connection mode, but this is not restrictive. For example, even in a case where determination is made that the external access point to which the communication unit 109 is currently connected is not included in the list, the CPU 103 can set the infrastructure connection mode. In this case, if determination is made that the external access point to which the communication unit 109 is currently connected is not included in the list, the CPU 103 displays a list of external access points to which the communication unit 156 can connect on the display unit 108 for the user to select one from the list.

The CPU 103 then transmits information of the external access point selected by the user to the communication device 151 by GATT communication via the short-range wireless communication unit 110, as a command for setting the communication device 151 to the infrastructure connection mode. The CPU 103 can display on the display unit 108 a screen for accepting input of connection information for connecting to the external access point that the user has selected to accept input of connection information from the user. In this case, the CPU 103 stores the connection information that has been input, and transmits a command to set the communication device 151 to the infrastructure connection mode. Thereafter, the CPU 103 switches the connection destination of the communication unit 109 to the external access point that the user has selected.

The CPU 103 can use the connection information input as described above at this time. This enables the CPU 103 to set the communication device 151 to the infrastructure connection mode, while also communicating with the communication device 151 via the communication unit 109.

In a case where determination is made that the external access point to which the communication unit 109 is currently connected is not included in the list, the CPU 103 can enable the user to select which of the infrastructure connection mode and the direct connection mode to set. In this case, the CPU 103 displays on the display unit 108 a list of external access points to which the communication unit 156 can connect, and a button for setting the direct connection mode.

In a case where the user selects one of the access points from the list, the CPU 103 sets the communication device 151 to the infrastructure connection mode where connection is performed via the selected access point. In a case where the button for setting the direct connection mode is selected, the CPU 103 sets the communication device 151 to the direct connection mode.

Setting processing regarding the connection destination of the communication unit 109 is performed using communication by the short-range wireless communication unit 110 in the present embodiment. Accordingly, the information processing device 101 can perform setting processing regarding the connection destination of the communication unit 109 without changing the connection destination of the communication unit 109.

While a description has been provided regarding an arrangement in the above-described embodiment where the information processing device 101 connects to an internal access point within the communication device 151 for direct connection, this is not restrictive. An arrangement can be made where the communication device 151 connects to an internal access point within the information processing device 101. In this case, the information processing device 101 transmits connection setting information containing the SSID and password for the internal access point within the information processing device 101 to the communication device 151 by GATT communication via the short-range wireless communication unit 110. The communication device 151 uses the SSID and password for the internal access point within the information processing device 101 contained in the connection setting information that has been received to connect the communication unit 156 and the internal access point within the information processing device 101.

While a description has been provided regarding an arrangement in the above-described embodiment where the two types of connection modes, infrastructure connection mode and direct connection mode, can be set by the connection setting processing, this is not restrictive. For example, the present embodiment can be applied to a device that is capable of just setting one of the infrastructure connection mode and direct connection mode. In this case, it is sufficient for the CPU 103 to determine in S505 whether the communication device 151 has been set to a settable connection mode. More specifically, if the settable connection mode is the direct connection mode, it is sufficient for the CPU 103 to determine whether the internal access point function within the communication device 151 is enabled and whether the communication unit 156 is connected to an external device other than the information processing device 101, or the communication unit 109.

If the settable connection mode is the infrastructure connection mode, it is sufficient for the CPU 103 to determine whether the communication unit 156 is connected to an external access point. In a case where it is determined in S505 that the connection mode of the communication device 151 has not been set, the CPU 103 performs processing to set the communication device 151 to a settable connection mode, regardless of the connection form of the communication unit 109. More specifically, in a case where the settable connection mode is the direct connection mode, following determination that the connection mode of the communication device 151 has not been set in S505, the CPU 103 skips the processing in S508, and performs the processing of S515 and thereafter. In a case where the settable connection mode is the infrastructure connection mode, following a determination in S505 that the connection mode of the communication device 151 has not been set, the CPU 103 skips the processing in S508, and performs the processing of S509 and thereafter.

While a description has been provided regarding an arrangement in the above-described embodiment where the connection mode that the communication device 151 is set to is decided in accordance with whether the communication unit 109 is connected to an external access point and whether the communication device 151 is capable of connecting to the access point to which the communication unit 109 is connected, this is not restrictive. For example, an arrangement can be made where one mode that a user selects from multiple types of connection modes is singularly set. In this case, following determination that the connection mode of the communication device 151 has not been set in S505, the CPU 103 performs processing to move the state of the communication device 151 to the connection mode selected by the user, regardless of the connection form of the communication unit 109.

More specifically, in a case where the connection mode selected by the user is the direct connection mode, following a determination in S505 that the connection mode of the communication device 151 has not been set, the CPU 103 skips the processing in S508, and performs the processing of S515 and thereafter. In a case where the connection mode selected by the user is the infrastructure connection mode, following a determination in S505 that the connection mode of the communication device 151 has not been set, the CPU 103 skips the processing in S508, and performs the processing of S509 and thereafter.

In a case where advertisement information has been received in S501, for example, the CPU 103 can reference device information contained in the received advertisement information and determine whether the device that transmitted the advertisement information that has been received is a registered device. A registered device is a device registered by the information processing device 101 as a device that performs communication using the printing application.

In a case of registering a device, the CPU 103 saves device information of the device being registered in a memory such as the ROM 104 or the like. The CPU 103 determines whether the device that transmitted the received advertisement information is a registered device by comparing the saved information with the device information contained in the received advertisement information.

In a case where the CPU 103 determines that the device that transmitted the received advertisement information is a registered device, the processing of S506 and thereafter is performed. The reason is the connection mode has most likely previously been set to the registered device since the device needs to be connected to the information processing device 101 in order for device registration to be performed. Accordingly, in a case where the device that transmitted the received advertisement information is a registered device, the CPU 103 can omit the processing of establishing a Bluetooth® Low Energy connection and the processing of executing GATT communication.

In a case where the result of determination in S506 is No, the CPU 103 establishes the Bluetooth® Low Energy connection and acquires the network status of the communication device 151. In a case where the CPU 103 determines that the device that transmitted the received advertisement information is not a registered device, the processing of S502 and thereafter is performed.

Other Embodiments

Embodiments can also be realized by supplying a program that realizes one or more functions of the above-described embodiment(s) to a system or device via a network or storage medium, and one or more processors in a computer of the system or device reading out and executing the program. Embodiments can also be realized by a circuit that realizes one or more functions (e.g., an application specific integrated circuit (ASIC)).

In a case where a communication device is connected to an external device, waste of resources due to connection processing where connection of the external device and communication device is re-executed can be suppressed.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. A control method of an information processing device that is capable of performing communication by Wi-Fi® and communication by Bluetooth® and that includes at least one processor configured to execute the control method, the method comprising:
   accepting a predetermined instruction based on a user operation to the information processing device;
   executing displaying processing that displays a predetermined screen for associating a communication device with the information processing device based on a fact that the predetermined instruction is accepted in a state that the communication device is not connected by Wi-Fi® to an external device that is outside the communication device and outside the information processing device; and
   executing, after the displaying processing is executed, communication processing that communicates, with the communication device by Bluetooth®, predetermined information for establishing a wireless connection of the communication device by Wi-Fi®.

2. The control method according to claim 1, wherein the predetermined information is information concerning the external device, and
   wherein the wireless connection of the communication device by Wi-Fi® is a wireless connection between the communication device and the external device corresponding to the predetermined information.

3. The control method according to claim 2, wherein the predetermined information is information concerning the external device to which the information processing device is connecting.

4. The control method according to claim 2, further comprising:
   accepting input of a password for connection with the external device from a user,
   wherein the predetermined information includes information concerning the password.

5. The control method according to claim 2, further comprising:
   acquiring, by Bluetooth®, a list of external devices to which the communication device can connect,
   wherein the predetermined information is information concerning the external device included in the acquired list.

6. The control method according to claim 1, wherein the displaying processing and the communication processing are not executed, and direct communication with the communication device not via the external device by Wi-Fi® is executed, in a state that the communication device directly connects with the information processing device by Wi-Fi® not via the external device.

7. The control method according to claim 1,
   wherein the communication processing is a processing that communicates, with the communication device by Bluetooth® Low Energy.

8. The control method according to claim 1, wherein the communication device is a printer.

9. The control method according to claim 1, wherein the communication device is a music player.

10. The control method according to claim 1, wherein the predetermined screen is for causing the communication device to be a communication partner of the information processing device.

11. The control method according to claim 2, wherein the predetermined screen is for establishing the wireless connection between the communication device and the information processing device via the external device.

12. The control method according to claim 11, wherein the predetermined screen is for accepting input of information concerning the external device.

13. The control method according to claim 11, wherein the predetermined screen is for accepting selection of the external device to which the communication device is to be connected from a list of external devices.

14. The control method according to claim 1, further comprising:
   receiving information concerning the communication device based on a fact that the predetermined instruction is accepted; and
   determining, based on the information concerning the communication device, whether the communication device is connected to the external device by Wi-Fi®,
   wherein the displaying processing is executed based on a fact that it is determined that the communication device is not connected to the external device by Wi-Fi®.

15. The control method according to claim 14, wherein the information concerning the communication device is received by Bluetooth®.

16. The control method according to claim 1, wherein a print job for causing the communication device to print is transmitted by the communication with the communication device via the external device by Wi-Fi®.

17. The control method according to claim 1, further comprising:
   not executing the displaying processing and the communication processing, and executing communication with the communication device via the external device by Wi-Fi®, in a case where the predetermined instruction is accepted in a state that the information processing device and the communication device are connected by Wi-Fi® to the external device.

18. An information processing device that is capable of performing communication by Wi-Fi® and communication by Bluetooth® and that includes at least one processor configured to execute the control method, the information processing device comprising:
   an accepting unit configured to accept a predetermined instruction based on a user operation to the information processing device;
   a first executing unit configured to execute displaying processing that displays a predetermined screen for associating a communication device with the information processing device based on a fact that the predetermined instruction is accepted in a state that the communication device is not connected by Wi-Fi® to an external device that is outside the communication device and outside the information processing device; and
   a second executing unit configured to execute, after the displaying processing is executed, communication processing that communicates, with the communication device by Bluetooth®, predetermined information for establishing a wireless connection of the communication device by Wi-Fi®.

19. The control method according to claim 18, wherein whether the displaying processing is executed or not is controlled based on that whether the predetermined instruction is accepted in the state that the communication device is not connected by Wi-Fi® to the external device or the predetermined instruction is accepted in the state that the information processing device and the communication device are connected by Wi-Fi® to the external device.

20. A non-transitory computer-readable storage medium storing a program which causes a computer to execute a control method of an information processing device that is capable of performing communication by Wi-Fi® and communication by Bluetooth®, the control method comprising:
   accepting a predetermined instruction based on a user operation to the information processing device;
   executing displaying processing that displays a predetermined screen for associating a communication device with the information processing device based on a fact that the predetermined instruction is accepted in a state that the communication device is not connected by Wi-Fi® to an external device that is outside the communication device and outside the information processing device; and
   executing, after the displaying processing is executed, communication processing that communicates, with the communication device by Bluetooth®, predetermined information for establishing a wireless connection of the communication device by Wi-Fi®.

* * * * *